United States Patent [19]
Bajzath et al.

[11] Patent Number: 6,144,644
[45] Date of Patent: Nov. 7, 2000

[54] SYSTEM AND METHOD FOR IMPLEMENTING CALL WAITING FUNCTIONS OVER A NETWORK

[75] Inventors: James A. Bajzath, Franklin Park; Nilay Ghoghari, Bedminster; Darek A. Smyk, Piscataway, all of N.J.

[73] Assignee: Telcordia Technologies, Inc., Morristown, N.J.

[21] Appl. No.: 09/082,243

[22] Filed: May 20, 1998

Related U.S. Application Data

[60] Provisional application No. 60/047,288, May 21, 1997, and provisional application No. 60/063,630, Oct. 27, 1997.

[51] Int. Cl.$^7$ .............................. H04L 12/64; H04L 12/66
[52] U.S. Cl. .......................... 370/259; 370/352; 370/356
[58] Field of Search ................................. 370/259, 271, 370/352, 353–356

[56] References Cited

U.S. PATENT DOCUMENTS

| | | | |
|---|---|---|---|
| 5,434,906 | 7/1995 | Robinson et al. | 379/67 |
| 5,608,786 | 3/1997 | Gordon | 379/100 |
| 5,625,676 | 4/1997 | Greco et al. | 379/88 |
| 5,751,706 | 5/1998 | Land et al. | 370/352 |
| 5,805,587 | 9/1998 | Norris et al. | 370/352 |
| 5,809,128 | 9/1998 | McMullen | 379/215 |
| 5,818,836 | 10/1998 | DuVal | 370/389 |

FOREIGN PATENT DOCUMENTS

| | | | |
|---|---|---|---|
| 96/38018 | 11/1996 | WIPO | H04Q 11/04 |

OTHER PUBLICATIONS

Nixon, T. 'Design Considerations for Computer–Telephony Application Programming Interfaces and Related Components', IEEE Communications Magazine, pp. 43–47, Apr. 1996.

Low, C. 'The Internet Telephony Red Herring', Global Telecommunications Conference, 1996, Globecom '96, Communications: The Key to Global Prosperity, pp. 72–80, Nov. 1996.

Dave Krupinski, "Computer Telephony and the Internet", www.flatironpublishing.com, pp. 1–10, Feb. 1997.

*Primary Examiner*—Melvin Marcelo
*Attorney, Agent, or Firm*—Joseph Giordano

[57] ABSTRACT

System and method for implementing call waiting functions over a network architecture which includes a public switched telephone network (PSTN) and the Internet. The call waiting system allows a user to receive incoming call information from a third party without interrupting an active connection with a second party, such as an Internet Service Provider (ISP). When the user attempts to connect to the ISP, a call waiting service is activated at a service control point connected to the PSTN and the user is notified about any incoming call attempts made after the user establishes a successful connection with the second party. The call waiting system indicates the number of, and provides information about incoming call attempts to the user. Meanwhile, the third party caller has the option of leaving a voice mail message for the user. If the user is actively connected to the Internet, a call waiting Internet server can be used to provide the incoming call information to the user's computer terminal. The call waiting system further allows the user to answer incoming calls in real-time when connected to the Internet and return unsuccessful incoming call attempts at a later time. Thus, Internet users can enjoy an uninterrupted Internet session without missing incoming calls. The call waiting system is configurable for non-Internet applications for allowing receipt of incoming call information without interrupting an active telephone connection.

5 Claims, 19 Drawing Sheets

SYSTEM AND METHOD FOR IMPLEMENTING CALL WAITING FUNCTIONS OVER A NETWORK

CROSS REFERENCE TO RELATED APPLICATIONS

This application is related to provisional U.S. patent application Ser. No. 60/047,288, filed on May 21, 1997 entitled "Method and System for Implementing Call Waiting Service", and it is also related to provisional U.S. patent application Ser. No. 60/063,630, filed on Oct. 27, 1997 entitled "System and Method for Implementing Call Waiting Functions Over a Network". The contents of both applications are hereby incorporated by reference.

BACKGROUND OF THE INVENTION

The present invention relates generally to implementing service functions over a network, and more particularly to a call waiting service implemented over a telephone network which allows a user, such as an Internet user, to receive incoming call information from a third party without interrupting an active connection between the user and a second party.

Currently, telephone users have the option of subscribing to a call waiting service through their local telephone company. When a third party attempts to contact a telephone user that is actively connected to a second party, this service provides a tone signal to the user notifying her of the incoming call. The user may ignore the tone signal or switch over to the incoming call. Although the user is notified of an incoming call immediately, current call waiting services are highly intrusive and unreasonably disruptive to the telephone user. If the user ignores the tone signal, the missed caller remains unknown. Certain phone systems allow a user to input a specific code to automatically dial the telephone number of the person making the last incoming call attempt. This feature, however, is useless if more than one person attempted to call the user during their telephone conversation with the second party.

With the emergence of the Internet, more people are relying on a single dial-up telephone line to make voice calls and access the Internet. These users currently have a choice of either disabling call waiting on the Internet access line and potentially missing incoming calls or leaving the call waiting service active and taking a risk that the Internet session will be abruptly terminated by an incoming call. Certainly, many telephone and Internet users would find these results unacceptable.

Therefore, it is desirable to provide a call waiting system for telephone users who do not want to miss incoming calls and at the same time do not like to be interrupted with new calls during a telephone conversation with another person.

In addition, it is desirable to provide a call waiting system that allows Internet users to have an uninterrupted Internet session and at the same time not miss incoming calls.

Additional objectives, features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

DESCRIPTION OF THE INVENTION

Systems and methods consistent with the present invention implement call waiting service functions over a telephone network allowing a user, such as an Internet user, to receive incoming call information from a third party without interrupting an active connection with a second party.

To achieve the objects and in accordance with the purposes of the invention, as embodied and broadly described herein, the invention comprises a system for implementing call waiting functions over a telephone network including a connecting means, activating means, notifying means, and providing means. Connecting means connect a user to a specified destination over the telephone network. Activating means activate a call waiting service available to the user. Notifying means notify the user about an incoming call attempt. Finally, providing means provide the user with information about the incoming call attempts without interrupting the connection between the user and specified destination.

A method for implementing call waiting functions over a telephone network, comprises several steps. Initially, a user is connected to a specified destination over the telephone network. A call waiting service available to the user is then activated and the user is notified about an incoming call attempt. Finally, the user is provided with information about the incoming call attempts without interrupting the connection between the user and specified destination.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate the invention and together with the description, serve to explain the principles of the invention.

In the drawings,

FIG. 3b shows a service logic program (SLP) for activating a call waiting flag consistent with a step of FIG. 3a;

FIG. 3c shows a SLP for providing a termination notification message consistent with a step of FIG. 3a;

FIG. 3d shows a SLP for updating service control point status consistent with a step of FIG. 3a;

FIG. 4b shows a SLP for deactivating a call waiting flag consistent with a step of FIG. 4a;

FIG. 4c shows a SLP for updating service control point status consistent with a step of FIG. 4a;

FIG. 5b shows a SLP for activating voice mail services consistent with a step of FIG. 5a;

FIG. 5c shows a SLP for updating a voice mail message consistent with a step of FIG. 5a;

FIG. 6b shows a SLP for determining appropriate action for third party call consistent with a step of FIG. 6a;

FIG. 6c shows a SLP for generating a table including calling party's name and telephone number consistent with a step of FIG. 6a;

FIG. 6d shows a SLP for sending the calling party's name and telephone number to a call waiting server consistent with a step of FIG. 6a;

BEST MODE FOR CARRYING OUT THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
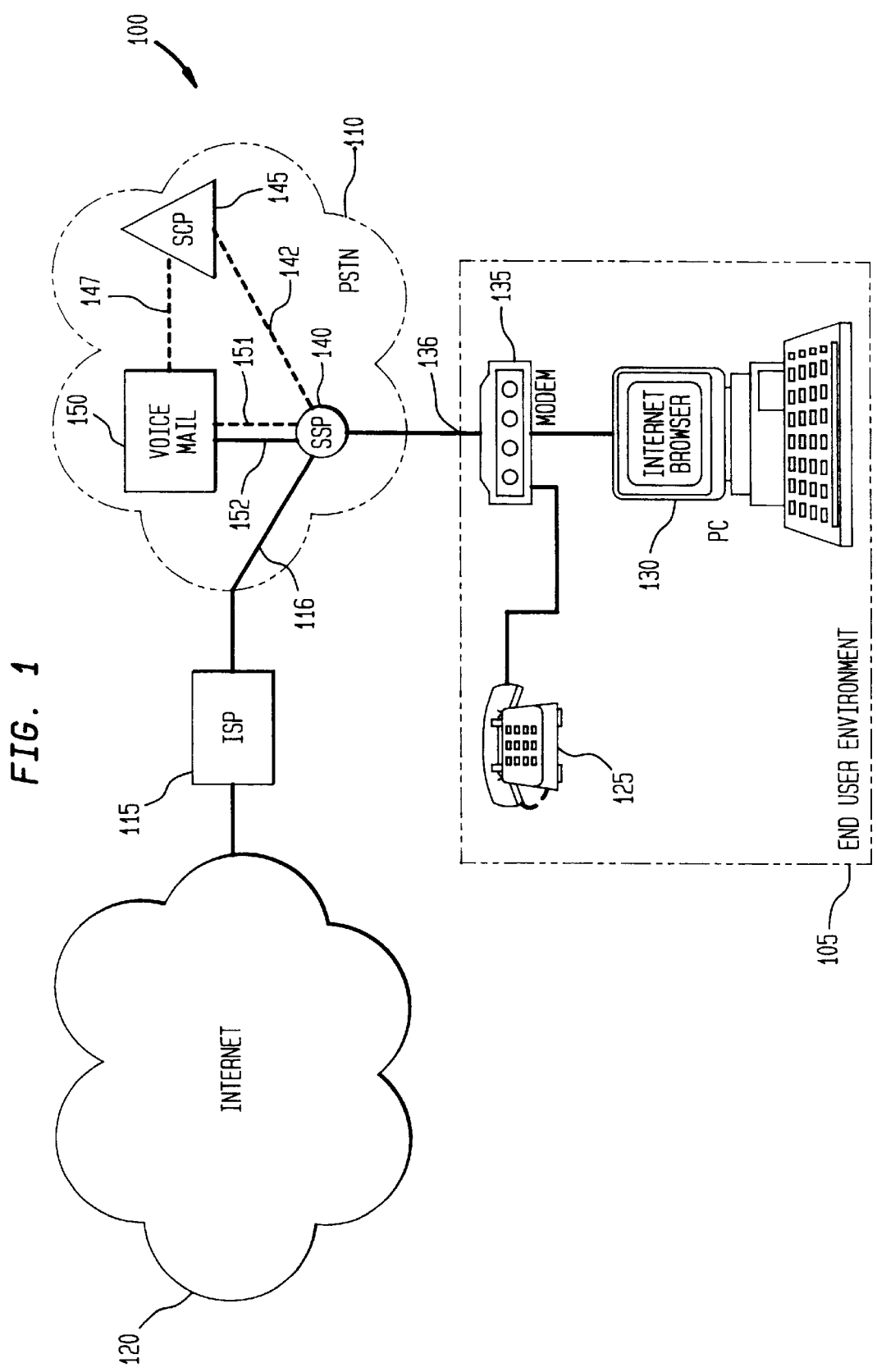
FIG. 1 shows a telephone network architecture which supports a call waiting system consistent with the present invention.

FIG. 1 illustrates a telephone network architecture for implementing call service functions consistent with the present invention. Telephone network architecture 100 includes an end user environment 105, a public switch telephone network (PSTN) 110, an Internet Service Provider (ISP) 115 (e.g., America On-line), and Internet 120.

End user environment 105 includes a telephone 125, personal computer 130 and modem 135. To make a voice call, an end user uses telephone 125 to manually dial the telephone number of the destination terminal. However, when the end user wishes to send and receive data (e.g., via Internet 120), modem 135 is utilized for such a connection. To facilitate an Internet connection through modem 135 and ISP 115, the end user typically uses Internet browsing software, such as Netscape Navigator™ or Microsoft Explorer™. Whether the end user is attempting to make a voice connection or a modem connection, each telephone number dialed from end user environment 105 is sent to PSTN 110 over telephone line 136. Although telephone 125 is shown connected to modem 135 to access telephone line 136 in FIG. 1, end user environment 105 is not limited to this configuration. For example, telephone 125 may be directly connected to telephone line 136.

PSTN 110 includes a service switching point (SSP) 140, a service control point (SCP) 145 and a voice mail system 150. Signals sent from end user environment 105 first arrive at SSP 140, typically a local telephone company, which analyzes the signals and determines where to route the call. For example, depending on the telephone number dialed, SSP 140 may route the call immediately over PSTN 110 to attempt a connection or communicate with SCP 145 over link 142 for further routing information.

SCP 145 controls the transfer of information signals between nodes (e.g., SSP 140 and voice mail system 150) on telephone network architecture 100 and preferably comprises a Bellcore ISCP® platform architecture to create and execute network services including, for example, the SPACE® and MSAP™ applications.

Voice mail system 150 communicates with SSP 140 over communication links 151 and 152 and communicates with SCP 145 over communication link 147 to effectively provide voice mail services to users of PSTN 110. Communication links 147 and 151 are preferably wireless communication channels for transferring information. Voice mail system 150 operates to record voice messages for call waiting service subscribers.

ISP 115 is connected to SSP 140 over communication link 116. ISP 115 supports multiple users who subscribe thereto for Internet access. ISP 115 may provide subscribers with additional services such as e-mail and searching functions.

Figure 2:
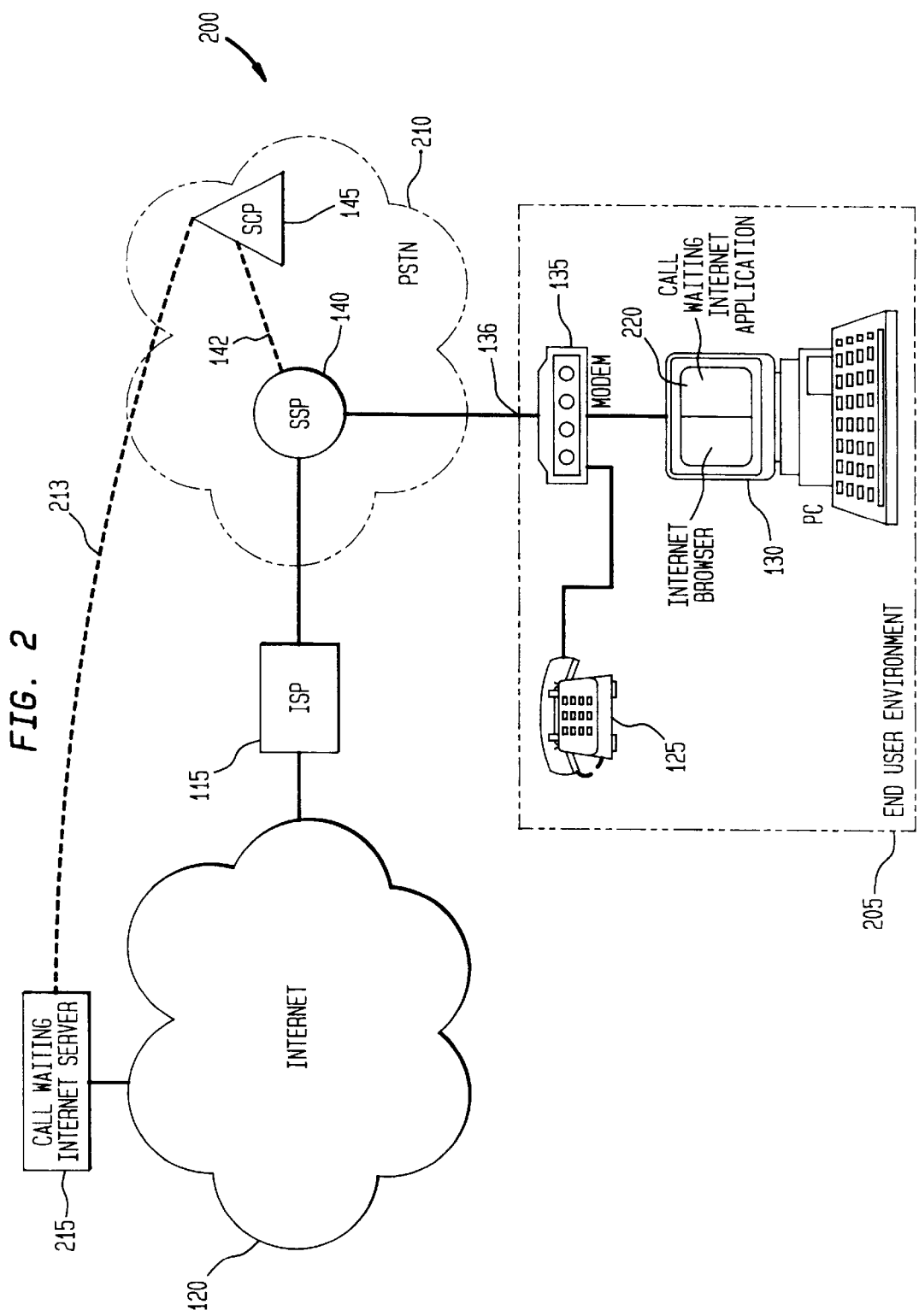
FIG. 2 shows an Internet network architecture which supports a call waiting system consistent with the present invention.

FIG. 2 illustrates an Internet network architecture 200 similar to that disclosed in FIG. 1. In particular, Internet network architecture 200 includes ISP 115 and Internet 120, both illustrated in FIG. 1. In addition to these elements, however, Internet network architecture 200 includes an end user environment 205, PSTN 210, and call waiting Internet server 215.

End user environment 205 is updated to include a call waiting Internet application 220 which is a software program executed by PC 130 for providing an end user with a variety of call waiting features specific to Internet applications. Calls from end user environment 205 attempting to connect with ISP 115 are routed over PSTN 210 which, in one embodiment, may not include dedicated voice mail system 150 illustrated in FIG. 1. SCP 145 communicates with SSP 140 over communication link 142 and call waiting Internet server 215 over communication link 213. Call waiting Internet server 214 is a computer server dedicated to managing call waiting functions over Internet 120. Call waiting Internet server 215 communicates with Internet 120 using standard transmission control protocol and Internet protocol (TCP/IP). Call waiting Internet application 220 software may be downloaded from ISP 115, call waiting Internet server 215, or provided on storage media (e.g., diskette or CD-ROM) to the user. When executed, the software retrieves information about incoming calls from call waiting Internet server using address-specific or "PUSH" technology.

Figure 3A:
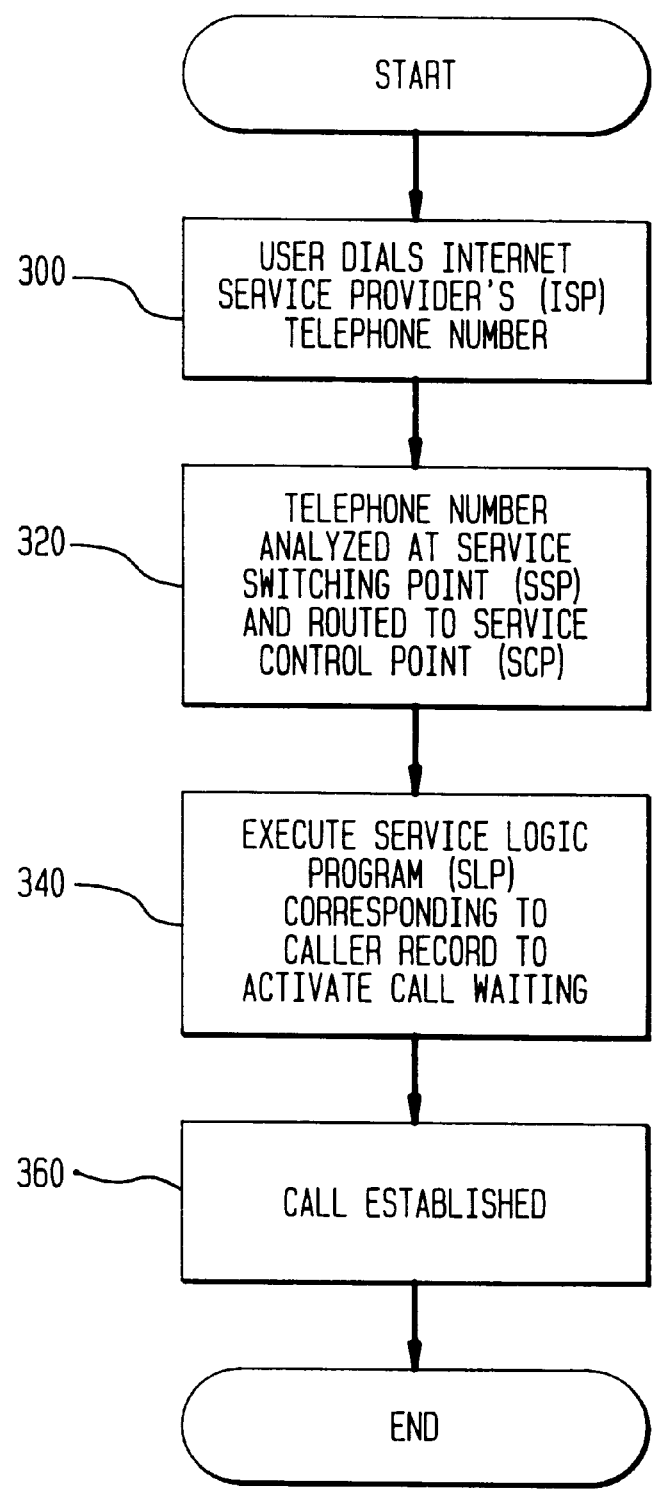
FIG. 3a shows a flowchart for activating the call waiting system.

Call waiting activation over the network architecture described above is illustrated in the flowchart of FIG. 3a. References to FIG. 1 components are provided. Initially, an end user dials ISP's 115 telephone number (step 300). An information signal including the user's ten-digit telephone number is sent to SSP 140 where the information signal is analyzed and routed to SCP 145 (step 320). Upon reaching SCP 145, a service logic program (SLP) corresponding to the information signal is executed (step 340). FIGS. 3b–3d, 4b–4c, 5b–5c, and 6b–6d are examples of SLPs executed in the SPACE® application for a Call Waiting DeLuxe Service™ also developed by Bellcore. For this application, SLPs are referred to as call processing records (CPRs).

Figure 3B:
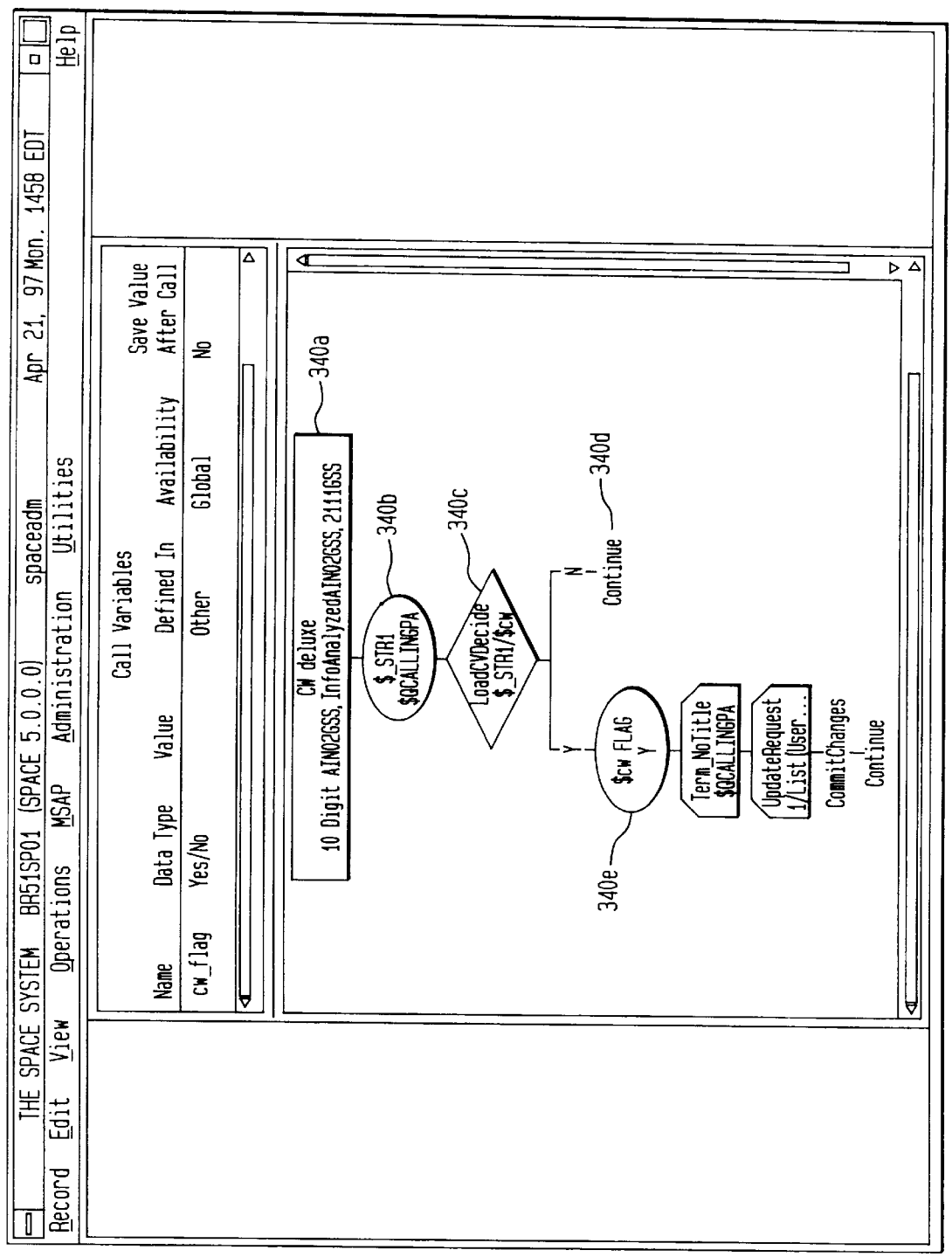
Figure 3C:
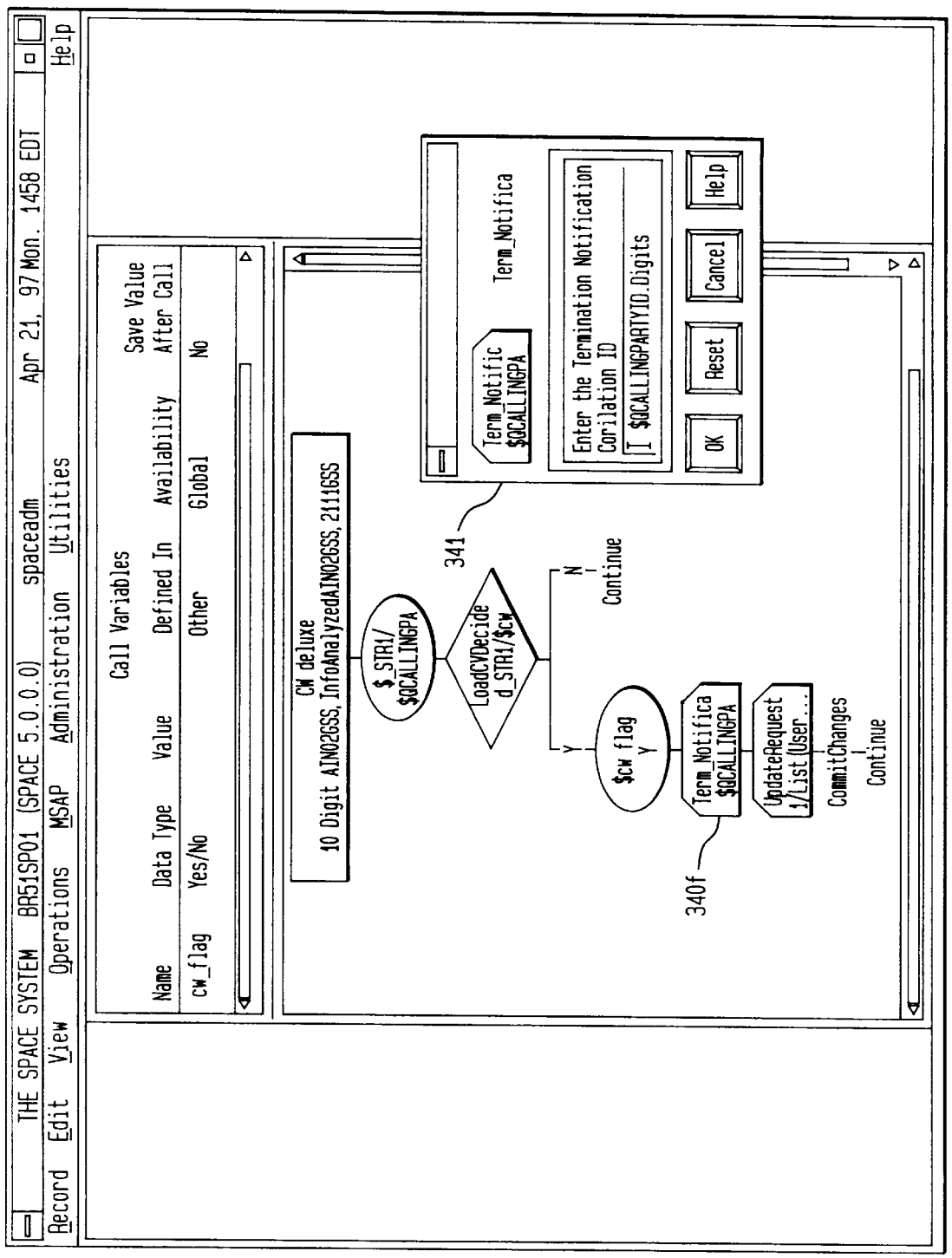
Figure 3D:
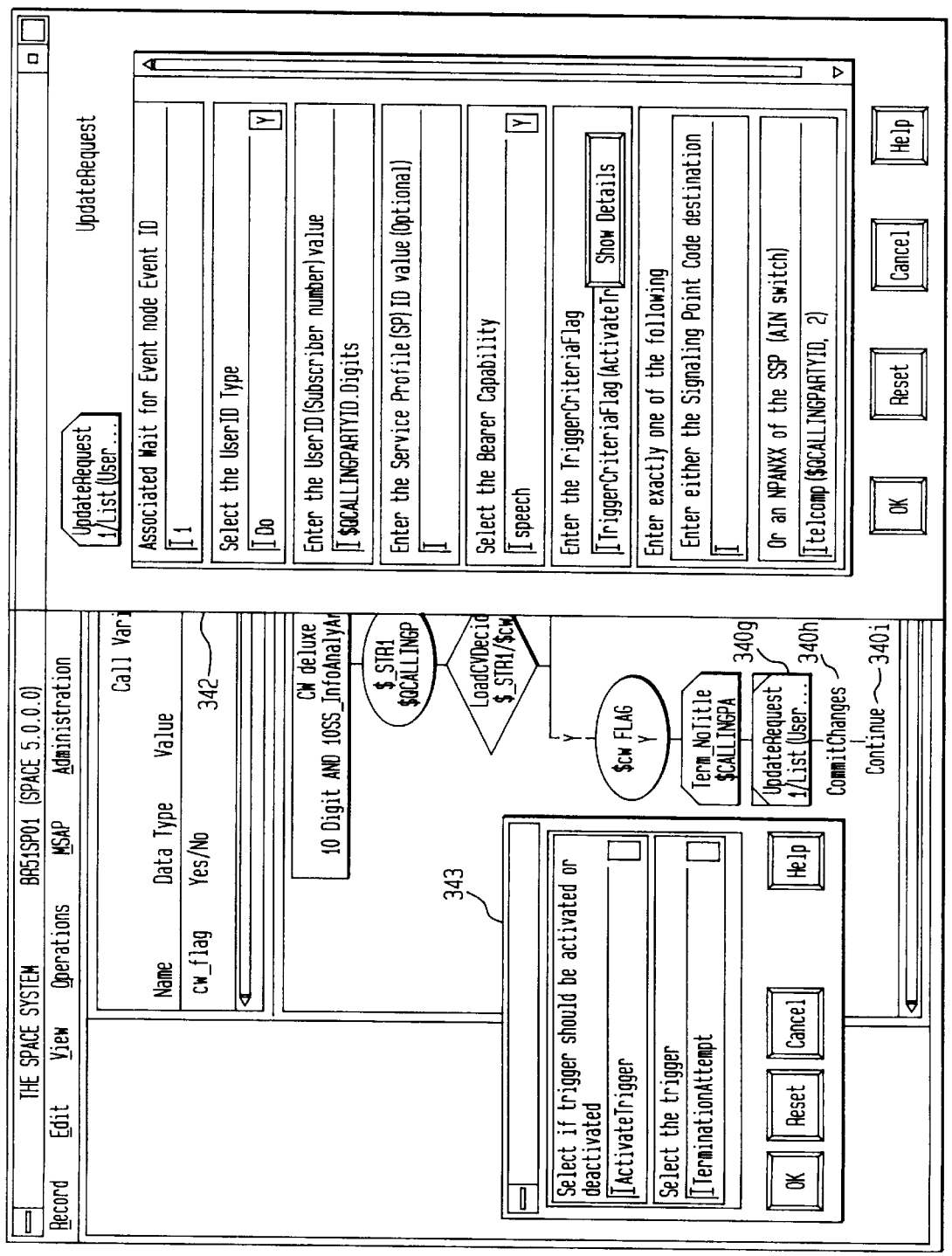

In FIG. 3b, a CPR for activating call waiting is illustrated. First, the information signal is analyzed (step 340a) and the CPR attempts to load a call waiting flag corresponding to the user's record (steps 340b and 340c). An unsuccessful load attempt indicates that the user does not subscribe to the Call Waiting DeLuxe Services™ and the call is routed to ISP 115 (step 340d). If the call waiting flag loads successfully, then the flag is activated (i.e., set to "yes") (step 340e). At this point, the CPR send a termination notification message to the switch for the user's line as illustrated in FIG. 3c (step 340f). In this figure, a termination notification window 341 is displayed allowing entry of a termination notification ID (i.e., user's telephone number). Subsequently, the CPR activates a termination attempt trigger in the SSP to notify the user of an incoming call while in communication with ISP 115 as illustrated in FIG. 3d (step 340g). Termination attempt window 342 and select trigger window 343 are provided to select the indicated active termination attempt parameters. Upon activating the termination attempt trigger, the CPR saves the modifications (step 340*h*) and instructs the SSP to route the call to the ISP (step 340*i*). Upon connecting with ISP 115, the call is established (step 360 of FIG. 3*a*), creating an active connection between the user and ISP 115 (step 370). Finally, the user's Internet protocol (IP) address is registered with call waiting Internet server 215 to activate call waiting services (step 380). By activating the call waiting feature consistent with the present invention, a user can receive incoming call information from a third party while connected to ISP 115.

Figure 4A:
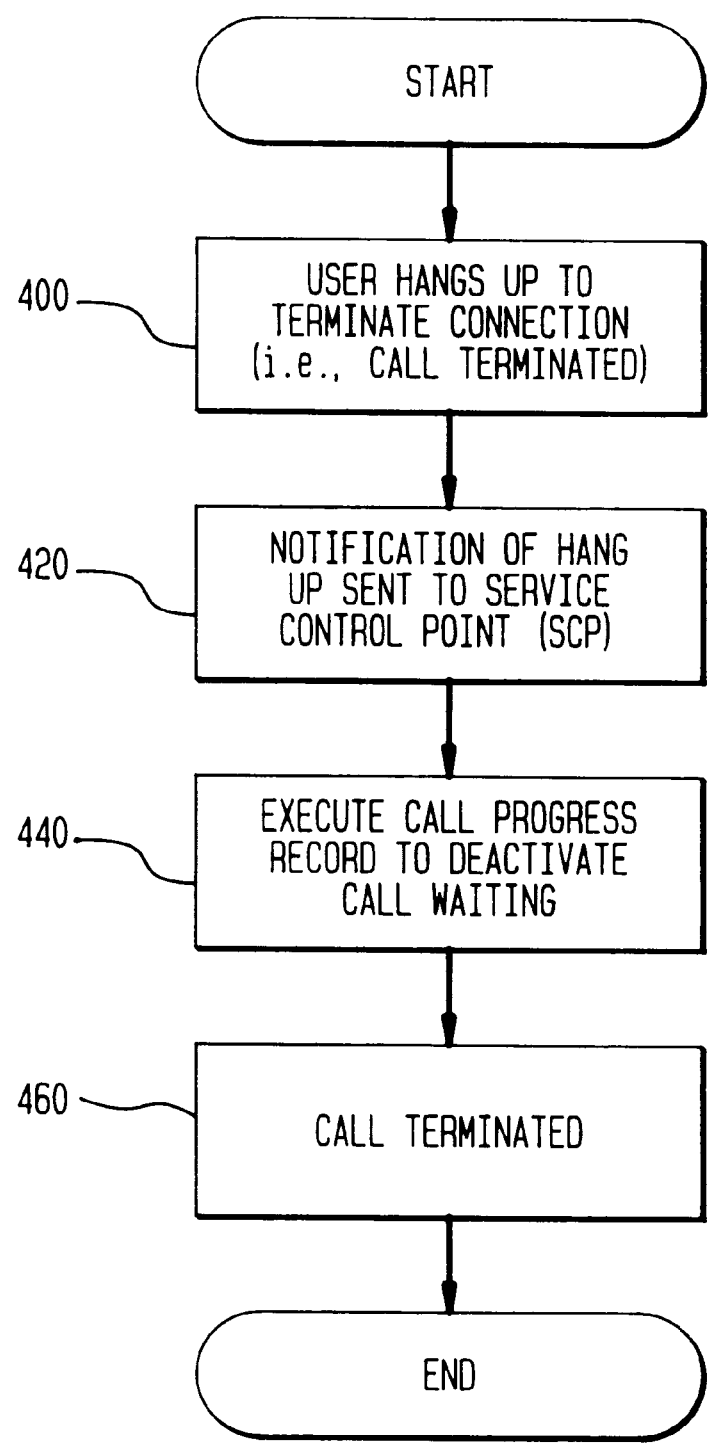
FIG. 4a shows a flowchart for deactivating a call waiting system.

The call waiting service as described herein may also be deactivated if a user chooses not to receive any incoming call information while connected to ISP 115. FIG. 4*a* provides a flowchart for deactivating the call waiting system consistent with the present invention. Initially, the user hangs up the telephone or otherwise terminates the telephone call (e.g., such as when exiting an Internet browser) (step 400). At this stage, SSP 140 sends a notification signal to SCP 145 indicating that the user has terminated the call (step 420). In response to the notification, SCP 145 executes a CPR to deactivate call waiting (step 440), as provided in FIGS. 4*b*–4*c*.

Figure 4B:
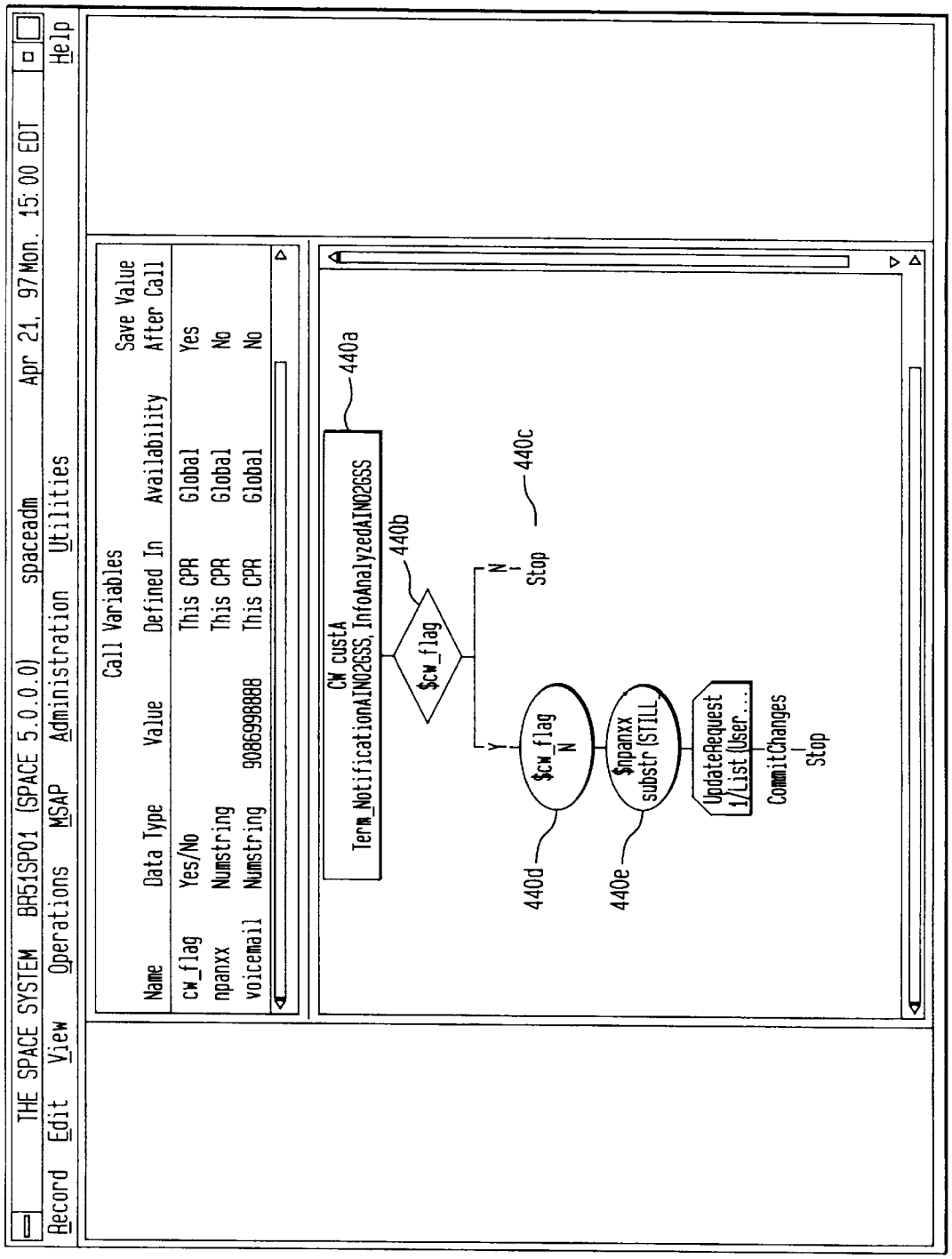
Figure 4C:
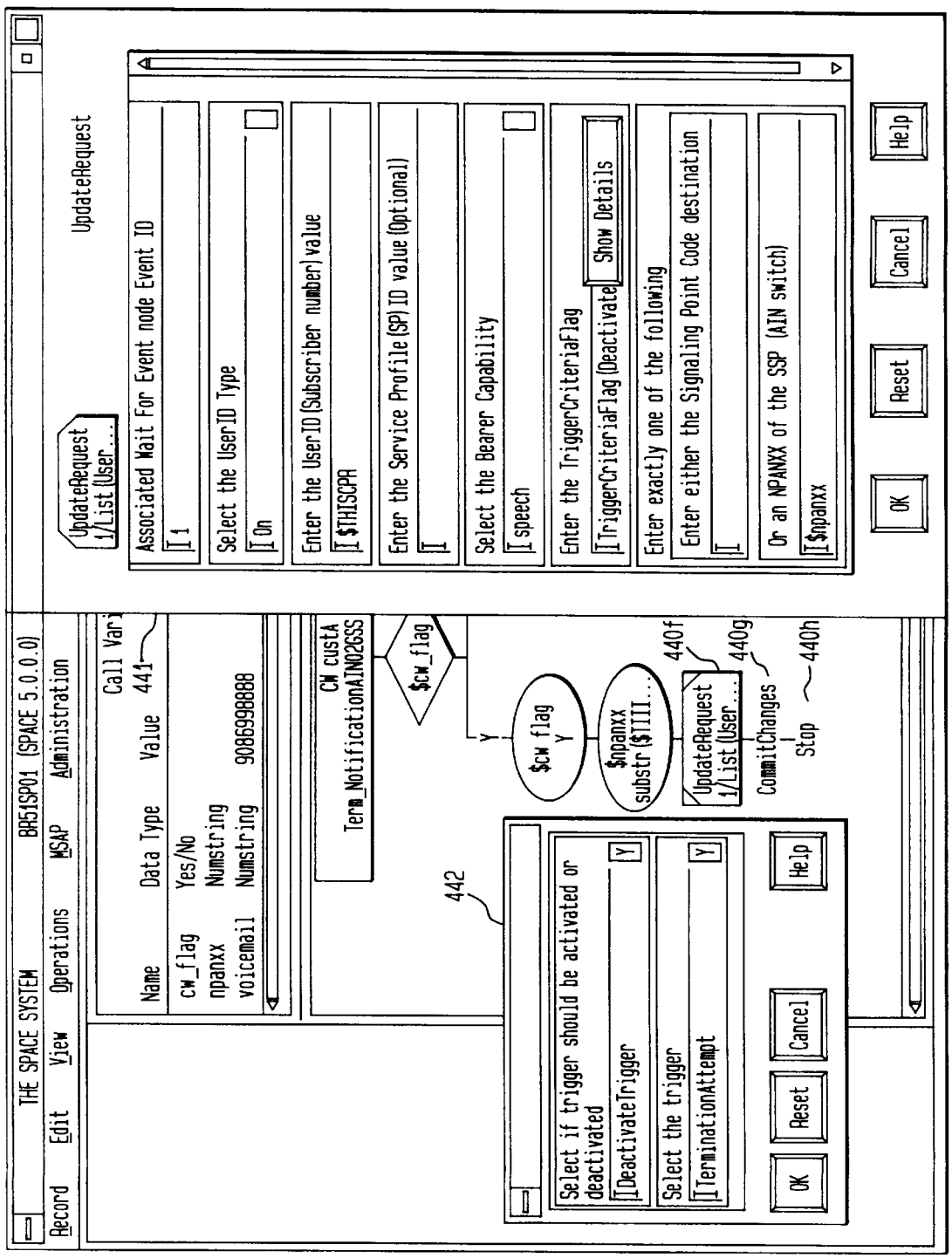

In FIG. 4*b*, the CPR analyzes the user's record (step 440*a*) and determines whether call waiting is active (step 440*b*). If call waiting flag is not active, CPR execution stops (step 440*c*). Otherwise, the call waiting flag is deactivated (i.e., turned off) (step 440*d*) and the user's telephone number is assigned to a temporary variable (step 440*e*). Subsequently, the termination attempt trigger status is updated (i.e., deactivated), as illustrated in FIG. 4*c* (step 440*f*). In this figure, termination attempt window 441 and select trigger window 442 are provided to select the indicated inactive termination attempt parameters. Upon deactivating the termination attempt trigger, the CPR saves the modifications (step 440*g*) and stops (step 440*h*). Finally, after completion of the CPR, the call is terminated (step 460 of FIG. 4*a*).

Figure 5A:
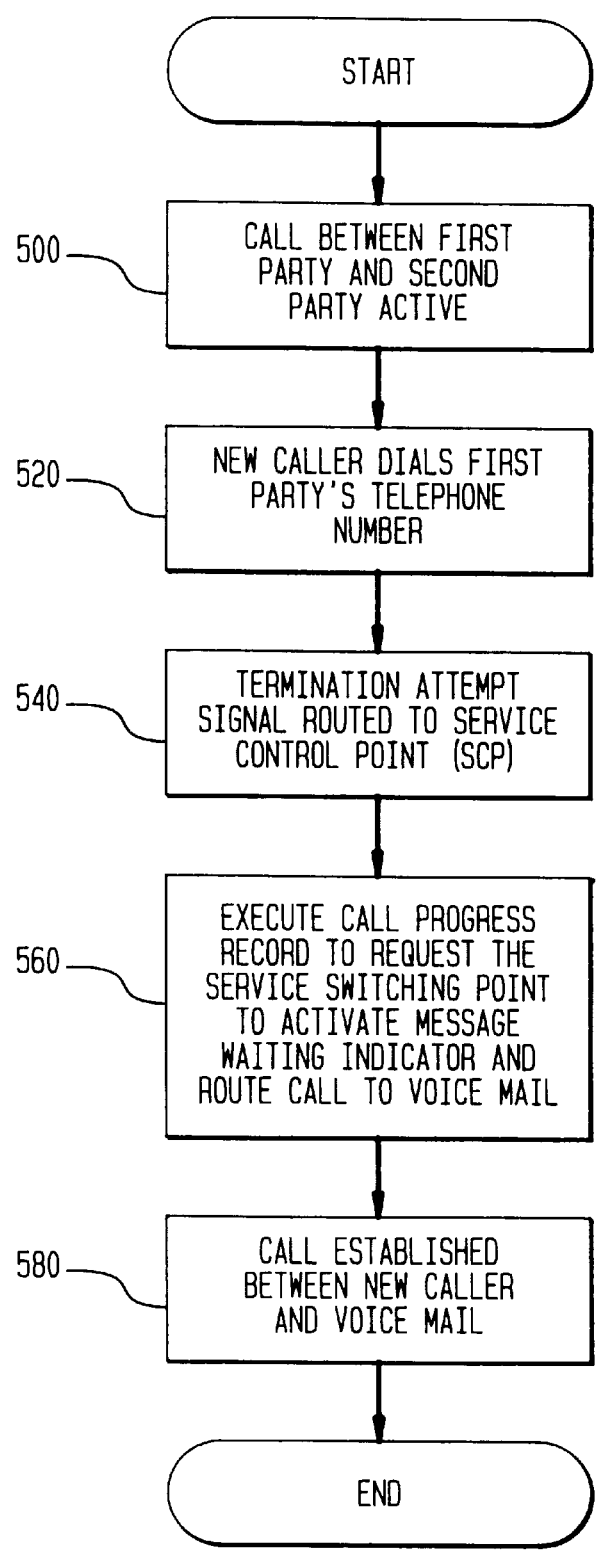
FIG. 5a shows a flowchart for routing new incoming calls to voice mail over the telephone network architecture of FIG. 1.

When the call waiting service of the present invention is active and a communication link is established between the user and ISP, for example, any new incoming calls to the user may be routed to voice mail system 150 illustrated in FIG. 1. The process of routing new incoming calls to voice mail system 150 is illustrated in the flowchart of FIG. 5*a*. First, during active communications between a user and ISP (step 500), a new caller dials the user's telephone number (step 520). At this point, a termination attempt signal is sent from the user's SSP to the SCP (step 540). The SCP executes a CPR requesting the user's SSP to activate a message waiting indicator and route the call to voice mail system 150 (step 560). Alternatively, the call can be routed to another telephone number (e.g., a second phone line at the user's location).

Figure 5B:
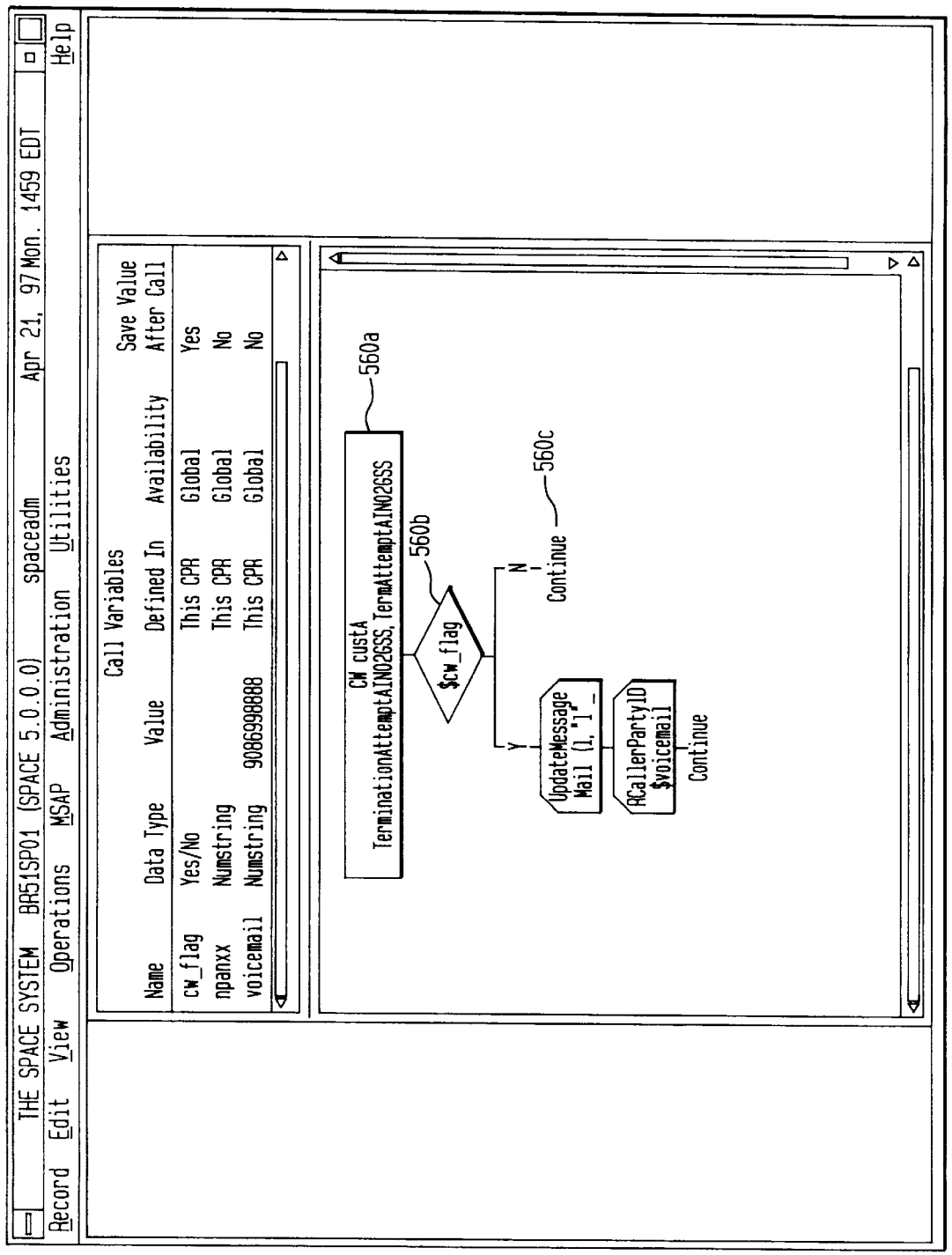
Figure 5C:
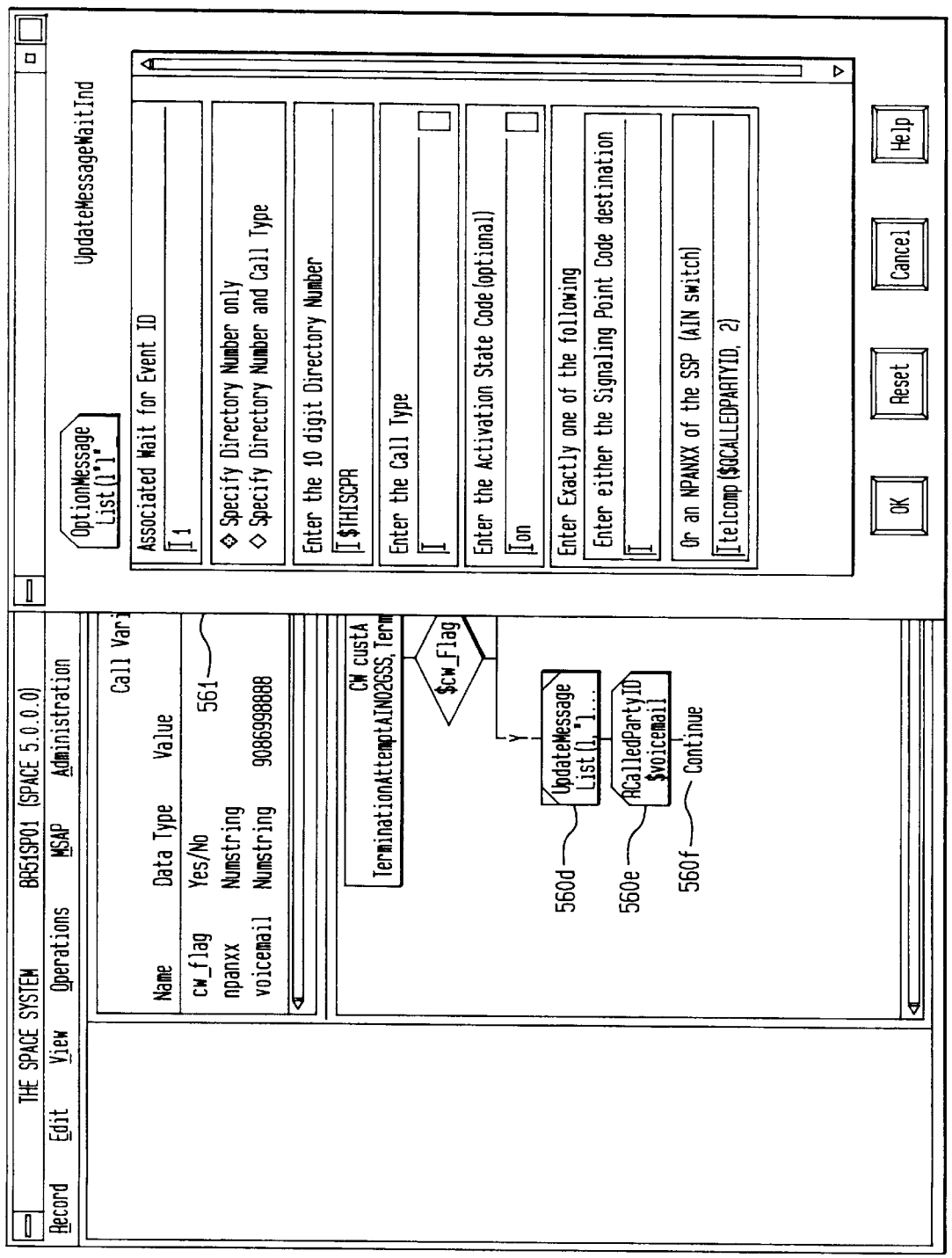

FIGS. 5*b*–5*c* illustrate the CPR for executing the voice mail system features consistent with the present invention. First, the CPR analyzes the record of the person called (i.e., end user connected to ISP) (step 560*a*) and determines if call waiting is activated (step 560*b*). If call waiting is not activated, CPR execution stops, and the query is routed back to the user's SSP (step 560*c*). If call waiting is active, the CPR activates a message waiting indicator, as illustrated in FIG. 5*c*. In this Figure, a message waiting indicator window 561 is activated to allow the system operator to enter the identified message waiting indicator parameters. Upon activating the message waiting indicator, a voice mail routing number is specified (step 560*e*) and the call is routed to voice mail (step 560*f*) over line 147 of FIG. 1. At this point, a call is established between the new caller and the user's voice mail so that the new caller may leave a message for the user for subsequent retrieval (step 580). Therefore, a user will not miss any new incoming calls while connected to a second party (e.g., an ISP).

Figure 6A:
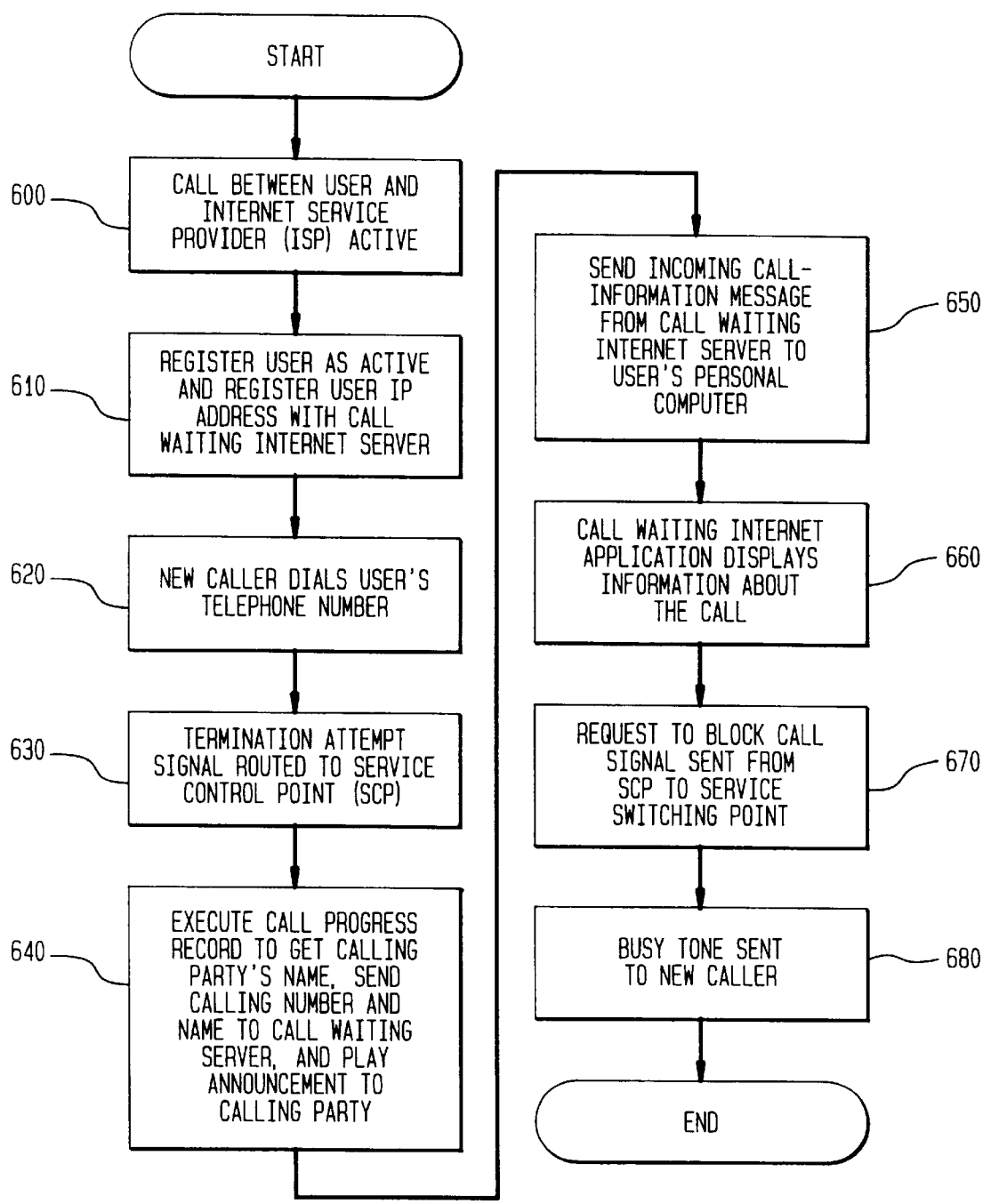
FIG. 6a shows a flowchart for routing and displaying incoming call information at the site of a user over the Internet network architecture of FIG. 2.

FIG. 6*a* shows a flowchart for routing and displaying incoming call information at the site of a user over the Internet network architecture of FIG. 2. Initially, a user's dials the user's telephone number (step 600) and a termination attempt signal is routed from the user's SSP (which may be SSP 140) to SCP 145 (step 620). Subsequently, SCP 145 executes a CPR to obtain the calling party's name, send the calling party's name and number to the call waiting server, and play an announcement to the calling party (step 640). Exemplary CPRs for executing step 640 are illustrated in FIGS. 6*b*–6*d*.

Figure 6B:
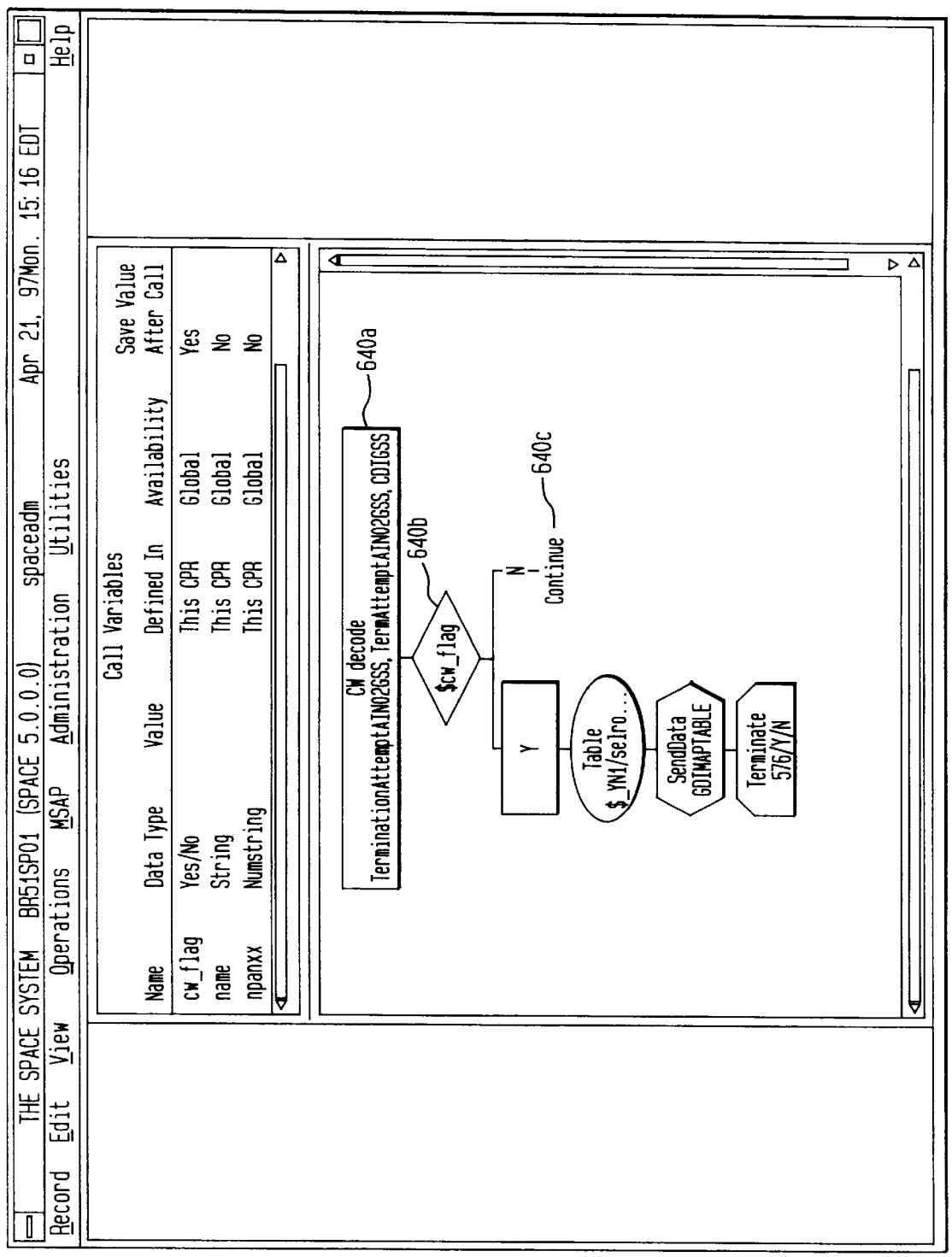
Figure 6C:
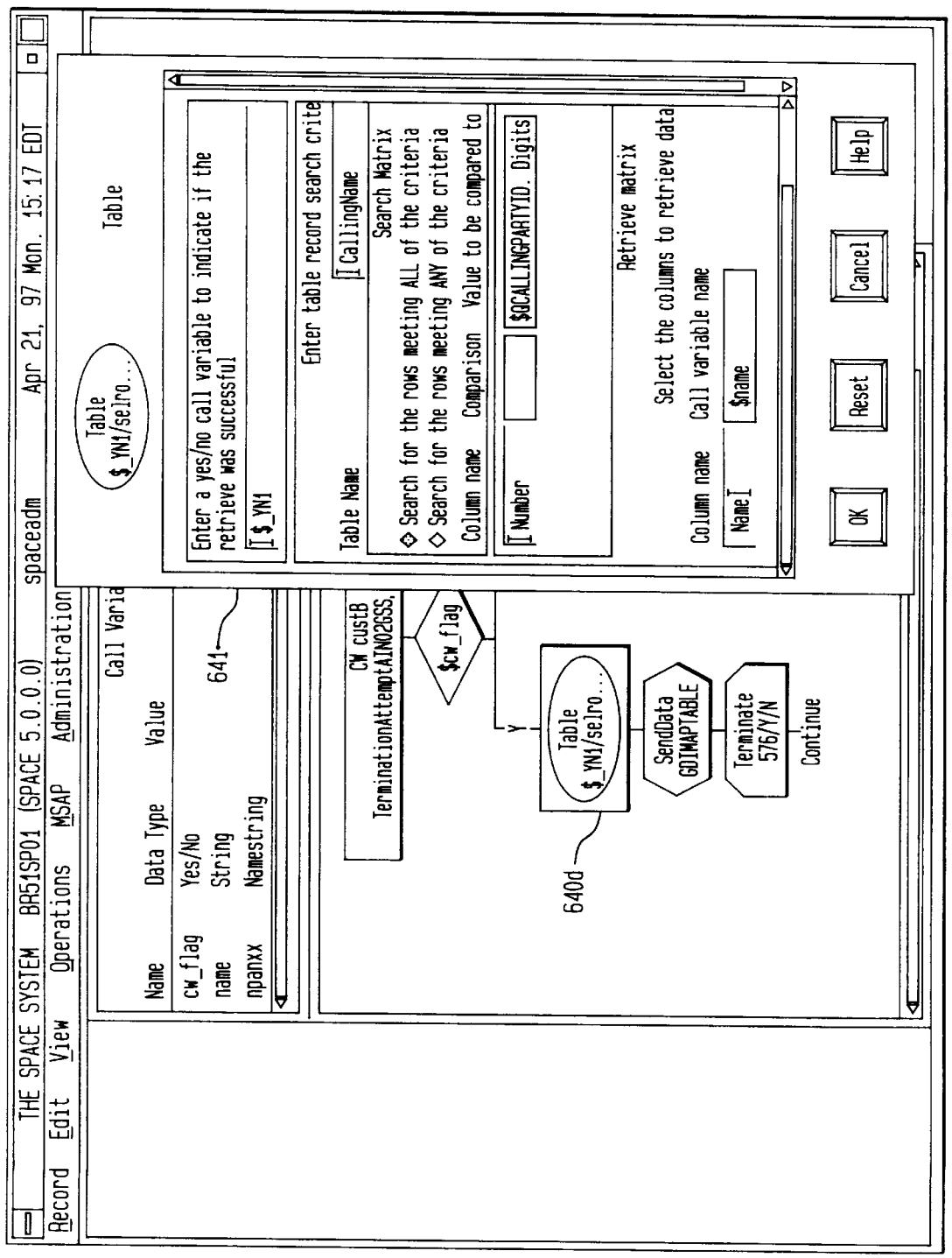
Figure 6D:
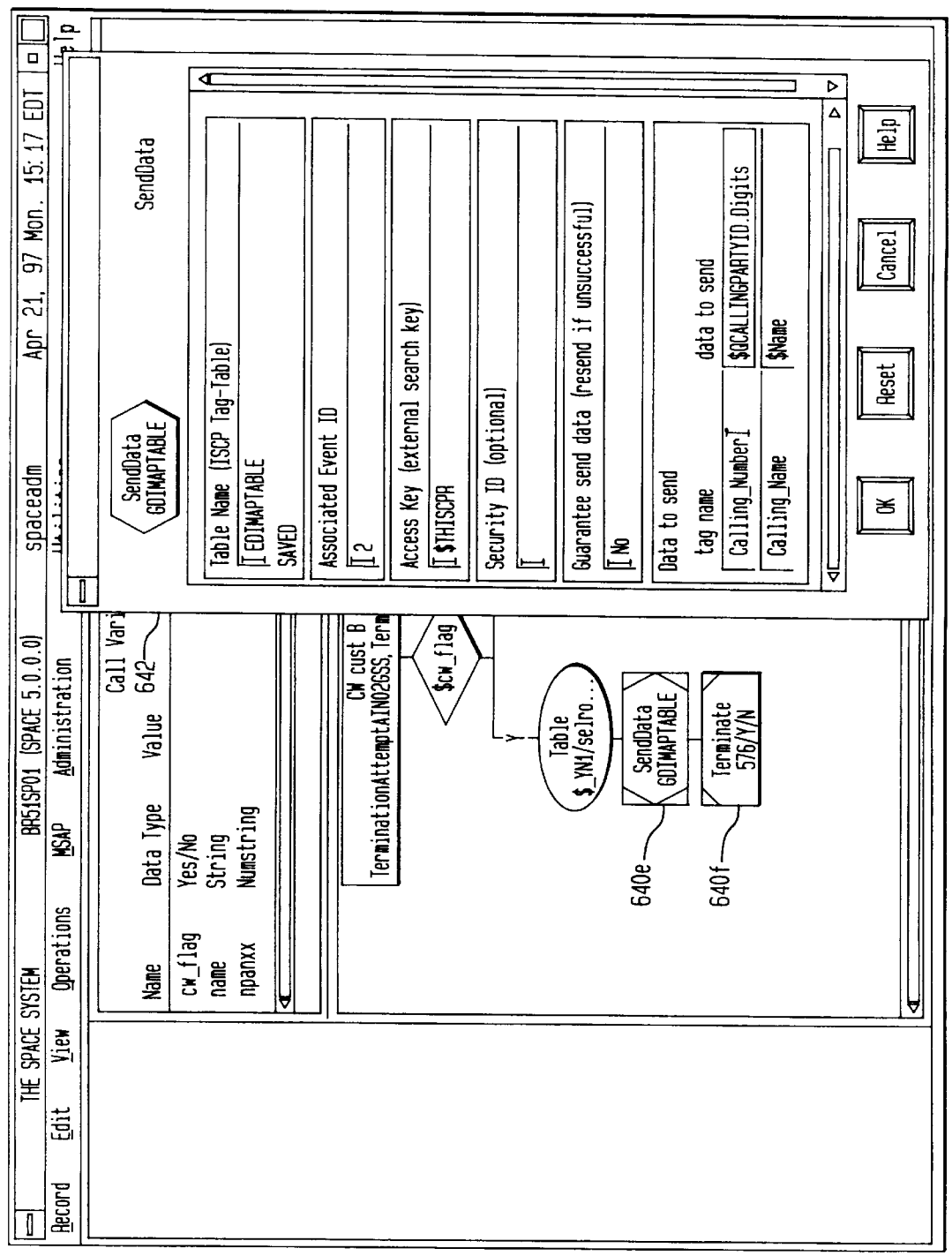

In FIG. 6*b*, the CPR analyzes the record of the person called (i.e., user connected to ISP) (step 640*a*) and determines if call waiting is activated (i.e., call waiting flag is set). If the flag is not active, then the query is routed back to the new caller's SSP. If the flag is active, then the CPR retrieves the caller's name and telephone number by activating a table function illustrated in FIG. 6*c* (step 640*d*). Table 641 allows a system operator to view parameters indicating whether the caller's name and telephone number are successfully retrieved. If so, the CPR activates a send data window 642, illustrated in FIG. 6*d*, that allows the system operator to view the parameters associated with sending the data (step 640*e*). Finally, the caller's name and telephone number are sent to the call waiting server and an announcement is played to the caller (step 640*f*).

Referring back to FIG. 6*a*, the caller's information is then sent from call waiting Internet server 215 to the user's personal computer which has an active connection with the ISP (step 650). The call waiting Internet application software residing in the PC of the user, then displays the caller's information on the display screen of the PC (step 660). At this time, the user is able to review the caller's information in real-time and decide whether to answer the call or wait until after their Internet session. To answer the call, the end user environment must be equipped to accept voice signals while connected to the Internet. If the user chooses not to answer the incoming call (e.g., by selecting "NO" on the screen or ignoring the caller information), call waiting Internet server 215 signals SCP 145 indicating that the call will not be accepted. Subsequently, SCP 145 sends a message to the user's SSP requesting that the call be blocked from connecting to the end user (step 670). In response to this message, the user's SSP sends a busy tone to the caller (step 680). The advantage of this system is that the user has the ability to review the incoming call information in real-time and decide when to return the incoming call.

Figure 7:
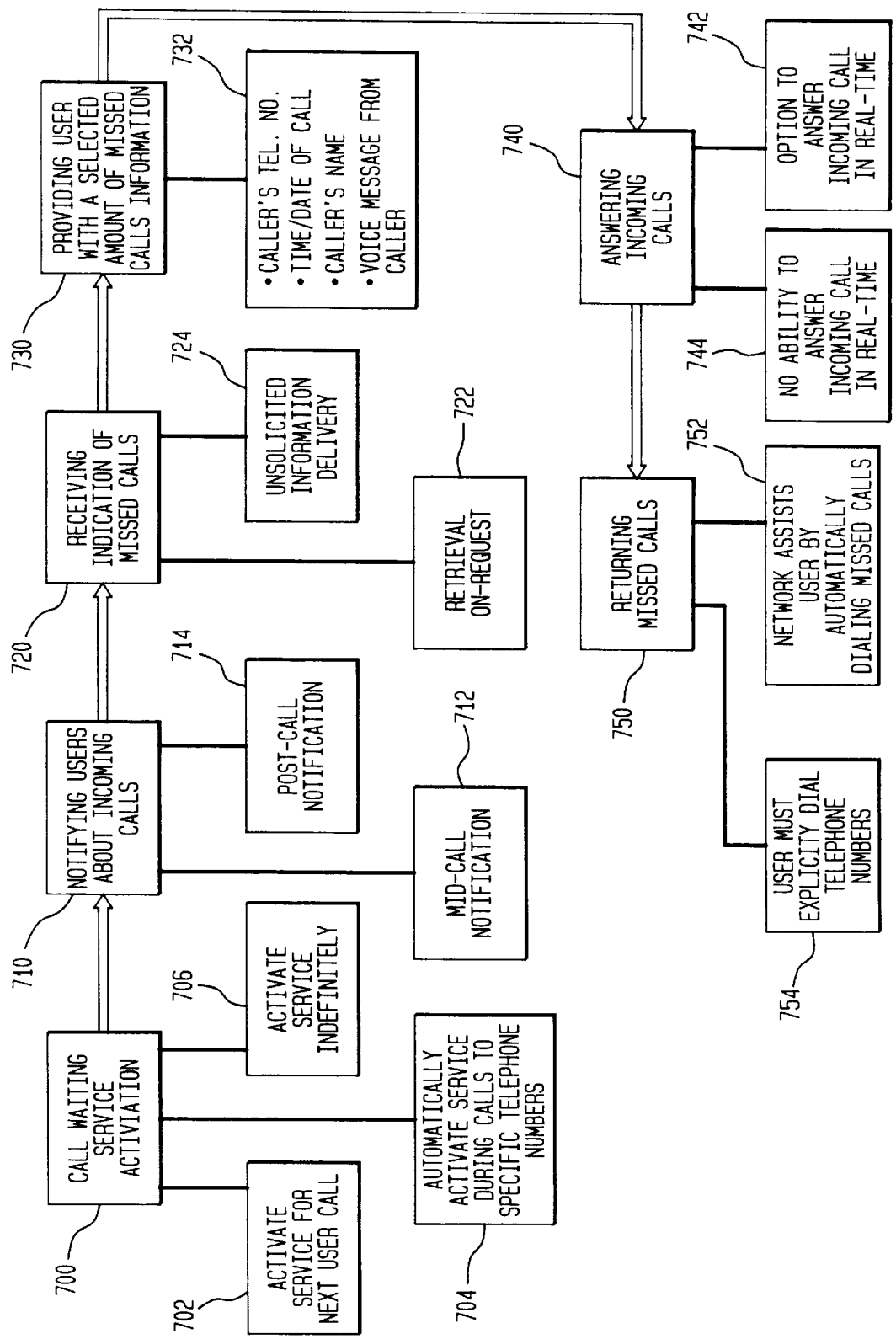
FIG. 7 shows a block diagram of the features available on the call waiting system consistent with the present invention.

FIG. 7 shows a block diagram of the configurable features available on the call waiting system consistent with the present invention. Each feature provides the user with convenient options so that the call waiting service can be customized for different users. These features may be implemented by one or more of the network architecture components described above. For call waiting service activation (block 700), the user has the options of activating the service only for the duration of the next call made by the user (block 702), automatically activating the service during telephone calls to specific numbers (block 704), or allowing the service to be active all of the time (block 706). The next feature of the call waiting service includes options for notifying a user about incoming calls (block 710). For this feature, the user may be notified about incoming calls from a third party while a call between the user and the second party is still in progress (block 712). In addition, the user has the option of being notified about missed calls from third parties after the termination of the active call between the user and the second party (block 714). Moreover, the user has options for receiving indications of the missed calls (block 720). The first option allows the user to dial a special telephone number or feature code to retrieve incoming call information (block 722). Alternatively, the user may implement an Internet application to make an explicit request to retrieve incoming call information. The user may also be provided with information without an explicit request (block 724). For this option, information delivery can be based on an Internet application which automatically displays information as soon as it becomes available to the user.

The user may also control the amount of information they receive about a missed incoming call (block 730). This information may include a caller's telephone number, the time and date of an incoming call, the caller's name, and a voice message from the caller (block 732). The way incoming calls are answered may also be controlled by the user (block 740). For this particular feature of the present invention, the user may have the option of answering the call in real-time (block 742) or not to answer the incoming call in real-time (block 744). Finally, if the user wishes to return a missed call, the user also has available options (block 750). The options include allowing the network to assist the user by automatically dialing the telephone number of the missed caller (block 752) or requiring the user to explicitly dial the telephone number herself (block 754).

Figure 8:
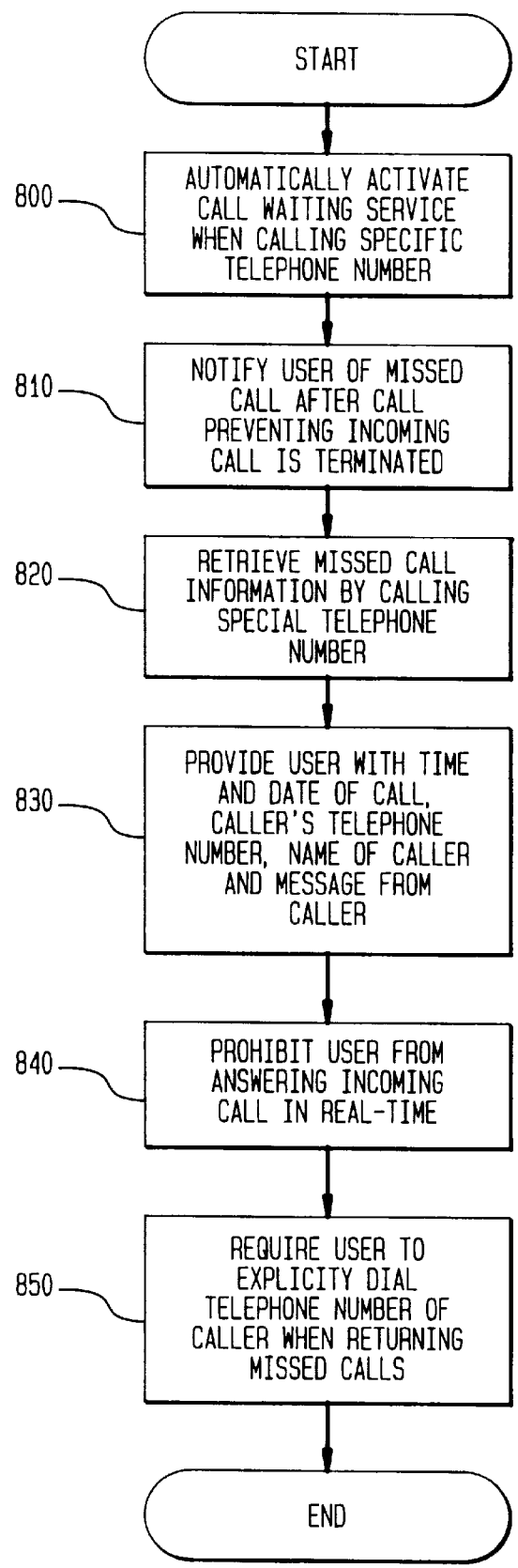
FIG. 8 shows a flowchart of a call waiting system package available to users over the telephone network architecture of FIG. 1.

FIG. 8 shows a flowchart of a pre-configured call waiting system package available to users over the telephone network architecture of FIG. 1. This call waiting system package is preferably customized for particular service requirements and automatically activates the call waiting service when the user calls one or more specific telephone numbers, such as different ISPs telephone numbers (step 800). Any incoming calls received by the user while connected to the ISP are routed to the voice mail system and the user is notified of the missed call after logging off from the ISP (step 810). The user is then able to retrieve the missed call information by calling a special voice mail telephone number (step 820). Upon calling the special telephone number, the user is provided with the time and date of the call, the caller's telephone number, the name of the caller, and a voice message from the caller (step 830). With this particular call waiting package, the user is not able to answer incoming calls in real-time (step 840). However, the user can explicitly dial the telephone number of the caller when returning the missed calls (step 850).

Figure 9:
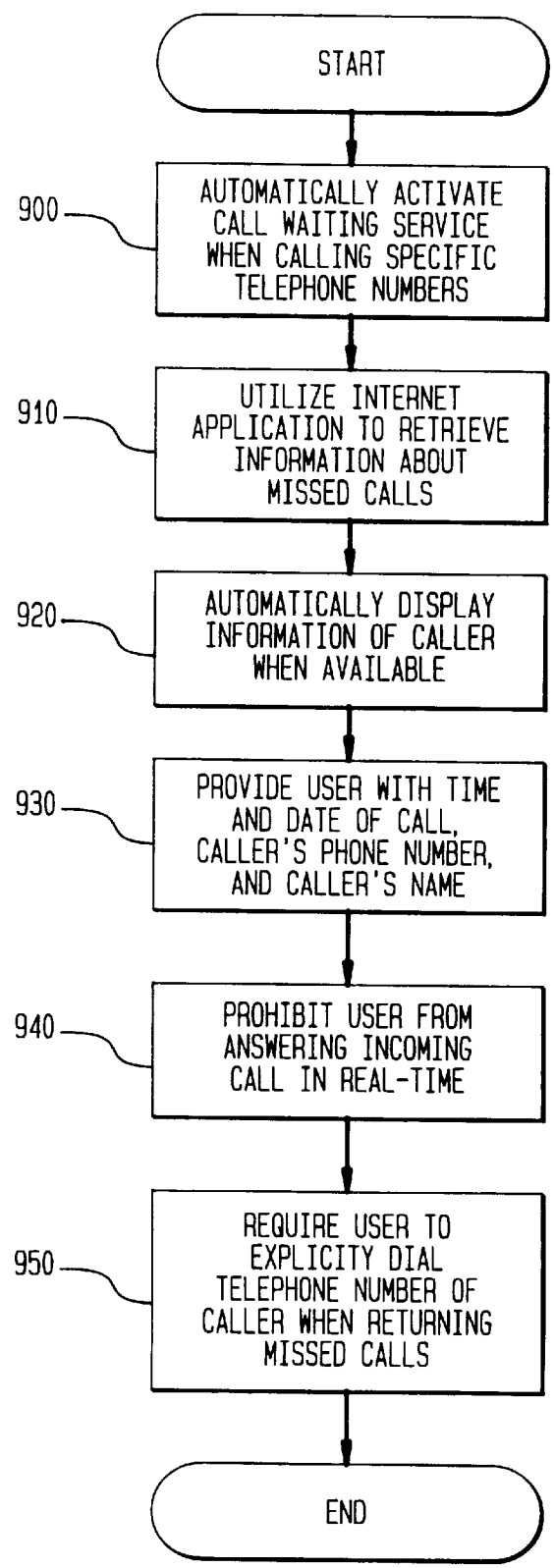
FIG. 9 shows a flowchart of a call waiting system package available to users over the Internet network architecture of FIG. 2.

FIG. 9 illustrates an alternative enablement of a call waiting system package. For this call waiting package, the user automatically activates the call waiting service when calling predetermined telephone numbers (step 900). When a third party attempts to call the user, an Internet application implemented by the user's PC may be utilized to find out information about the missed call (step 910). The Internet application may be used and programmed to automatically display the missed call information as soon as it is available to the user (step 920). The system then provides the user with the time and date of the call, the caller's telephone number, and the caller's name (step 930). With the second call waiting system package, the user is also not able to answer incoming calls in real-time (step 940). As with the first call waiting system package, however, the user can explicitly dial the telephone number of the caller when returning the missed calls (step 950).

The call waiting system discussed herein provides a user with a variety of options for receiving incoming call information without interrupting an active connection with a second party. The call waiting system is less intrusive than conventional call waiting services in that the user has complete control over when to receive, review, and return missed incoming calls. Moreover, the call waiting Internet application feature is unprecedented and adds versatility to other features of the call waiting system. For example, the user can view information from each and every incoming call shortly after the call is made. This feature gives the user the flexibility of returning an important telephone call immediately as opposed to missing the call entirely or waiting until the Internet session has ended.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method of implementing call waiting functions over a telephone network for a user connected to a data network, comprising the steps of:

in response to a connection from a user to an Internet Service Provider (ISP), activating a call waiting service at a service control point (SCP) for the user's telephone number; said activating step further comprising the steps of:

in response to the connection from the user to the ISP, determining at the SCP the call waiting subscription status of the user;

if the user is subscribed to the call waiting service, activating a trigger in a switch in the telephone network to alert the SCP of subsequent call attempts to the user; and routing the call to the ISP for creation of a data connection between the user and ISP;

in response to a subsequent call attempt to the user, determining at the SCP call notification instructions for the user;

if the user requests notification over the data connection, sending call information from the SCP via a call waiting Internet server to the user;

in response to receiving the call information, sending a message from the user via the call waiting Internet server to the SCP containing call handling preferences; and in response to termination of the connection to the data network, deactivating the call waiting service at the SCP; said deactivating step further comprising the steps of:

in response to termination of the user's call to the ISP, determining at the SCP the call waiting deactivation instructions;

if call waiting is active for the user, deactivating the trigger in the switch in the telephone network; and terminating call processing in the SCP and the telephone network.

2. The method of claim 1 wherein if the user requests notification via voice mail:

activating a message waiting indicator for the user's line at the switch in the telephone network; and routing the subsequent call attempt to a voice mail system.

3. The method of claim 1 further comprising the step of registering the user's Internet connection status with a call waiting Internet server.

4. The method of claim 1 wherein if the call handling preferences contain a request by the user to answer the call, routing the call from the switch in the telephone network via the ISP to the user.

5. The method of claim 1 wherein if the call handling preferences contain a request by the user to not answer the call, sending a message from the SCP to the switch in telephone network to block the call.

* * * * *